Sheet 1-2 Sheets.

W. Murphy,
Spirit Meter,

N° 56,156.    Patented July 3, 1866.

Witnesses:    Inventor:

Sheet 2 - 2 Sheets

W. Murphy,
Spirit Meter,

N° 56,156. Patented July 3, 1866.

Witnesses:

Inventor:

UNITED STATES PATENT OFFICE.

WILLIAM MURPHY, OF PARIS, CANADA WEST.

IMPROVED LIQUID AND SPIRIT METER.

Specification forming part of Letters Patent No. 56,156, dated July 3, 1866.

*To all whom it may concern:*

Be it known that I, WILLIAM MURPHY, of Paris, Canada West, have invented a new and Improved Liquid and Spirit Meter; and I do hereby declare that the following is a full, clear, and exact description thereof, which will enable others skilled in the art to make and use the same, reference being had to the accompanying drawings, forming part of this specification, in which—

Figure 1:
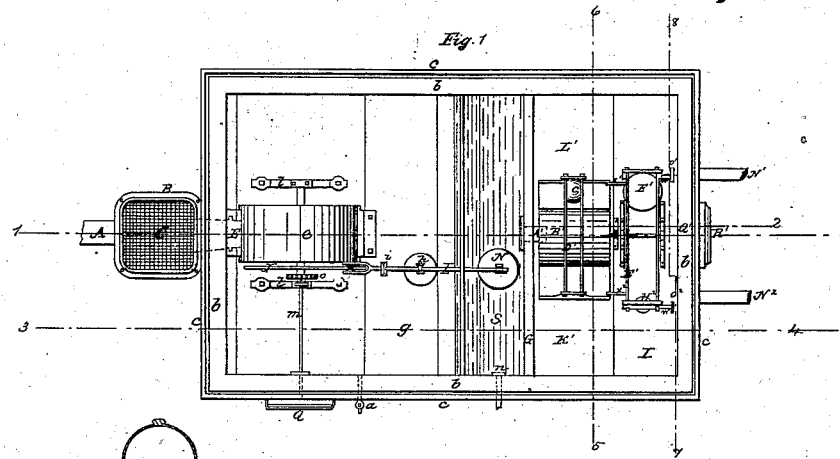
Figure 2:
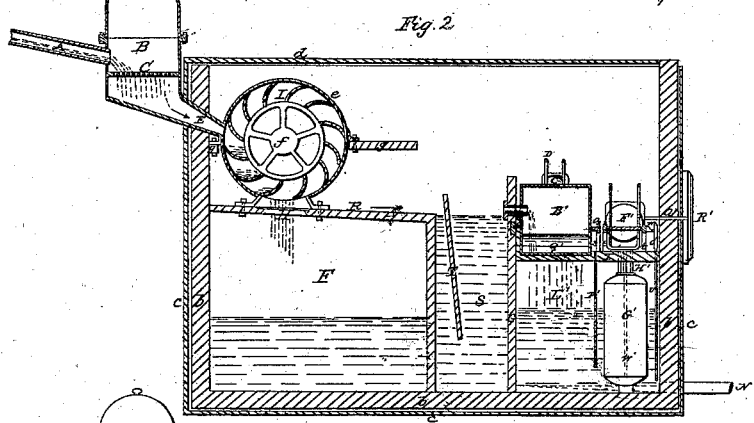
Figure 3:
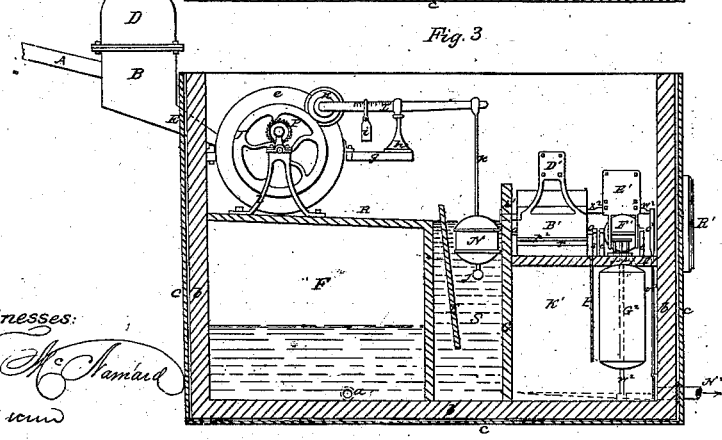
Figure 4:
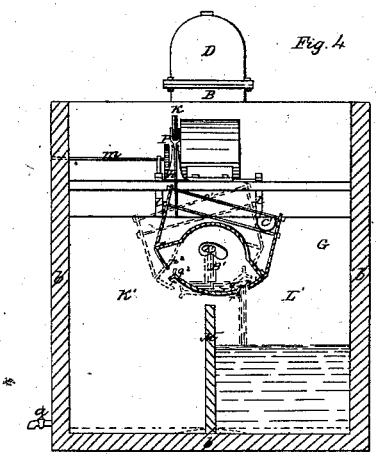
Figure 5:
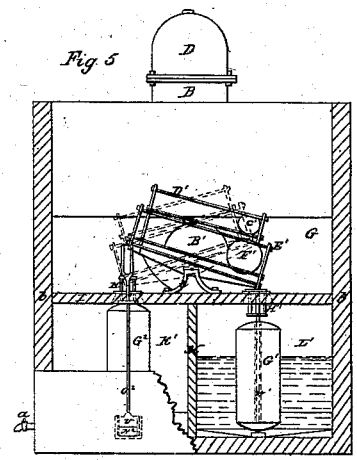
Figure 6:
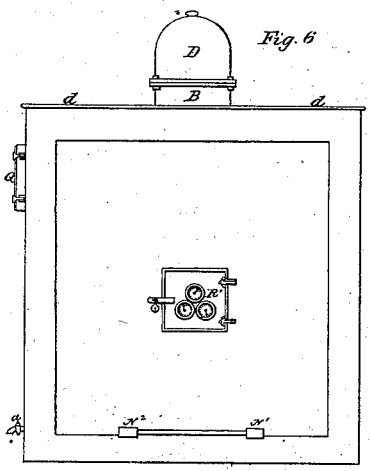

Figure 1 represents a plan or top view with the cover of the case removed. Fig. 2 is a longitudinal section in the plane indicated by the line 1 2. Fig. 3 is a similar section in the line 3 4. Fig. 4 is a transverse section in the line 5 6. Fig. 5 is a similar section in the line 7 8. Fig. 6 is an end elevation of the case.

Similar letters of reference indicate like parts.

This apparatus is for measuring and registering the quantity of spirit which may flow through it from the discharge-pipe of a still or from any other source according to the strength and temperature.

It consists of two principal parts, which, though quite distinct in their operation, are contained in the same case, and form, as combined, one machine.

The first of these two parts is the weighing apparatus, which receives the spirit as it would flow from the discharge-pipe of a still or elsewhere, weighing it according to a certain strength, registers the quantity on a dial or indicator, which is attached to and worked by the machinery of this weighing apparatus. This dial is not of any particular form or make, but is arranged somewhat similar to those in ordinary use for gas-meters. Any description of indicator at present in use and which may be suitable may be used.

The second part receives the spirit after it has passed through the weighing apparatus, and measures the quantity, indicating the quantity in gallons on a separate dial, which may be of the same kind, as above described, only that the motion will be imparted to it in a different manner, which is hereinafter described. By this second measurement a check is always kept upon the first measurement, so that the least variation in either can at once be detected. The weighing and measuring parts, which are common to both these, are a supply-pipe, receiver, sample-receiver, funnel, &c., and are hereinafter described at greater length.

As the strength of the spirit which is manufactured in a distillery constantly varies, a sample-receiver forms a part of the machine, and is so constructed as to receive a small quantity of all the spirit which may flow through the apparatus, and give the average strength of the whole.

The quantity of spirit which has been manufactured and allowed to flow into the apparatus can at any time be ascertained by reading the indications on the dial attached to the first part, which will give the weight. The weight of a gallon of spirit at the strength which the hydrometer of this portion of the machine has been set having been ascertained, the whole quantity can be obtained by a simple calculation. The dial of the measuring part will indicate the quantity in gallons; but as the quantity which it indicates will be of different strength, it is necessary to reduce it to a known strength. This will be done by comparing the indications with the spirit contained in the sample-receiver, which is an average of all which has passed through the apparatus. Accompanying this portion of the apparatus is a table of corrections for the different strengths of spirit, from water to fifty over proof, at different temperatures. These corrections require to be added to or deducted from the quantity indicated on the dials. A comparison of the quantities registered by the weighing and measuring part of the apparatus will show the least variation of either.

The working parts of the machine are constructed of copper and brass; but I am not confined to the use of these metals, as any other suitable metal may be employed. The outer cases may be of wood or metal, or, as shown on the drawings, with an inner wooden case and an outer iron case. The top of the inner case is open, and the outer case has a glass top, hinged so that it may be opened for the examination of the apparatus. This cover or glass top is fastened by locks, of any suitable make or pattern, which will prevent it from being opened without detection by parties who are not authorized to do so. The dials or indicators which are affixed to the outside of the cases are also protected, so that they cannot be tampered with, by small iron doors fastened with locks, as above described. Each of these doors has small openings cut through it opposite the face of the dials, so that the indications may be read without opening the door. The glass top being shut and locked, and also the doors of the indicators, it will, from the construction of the apparatus, be impossible for any person to tamper with or affect the correct working.

The indicators Q and R' being set at 0, and the glass top $d\ d$ and the doors of the indicators locked up, spirit is allowed to flow from a still or any other source through the supply-pipe A into the receiver B, where it is discharged on the surface of the screen C, which is fixed in the receiver B, and is perforated by small holes countersunk on the under side. The screen C retains any grains or foreign substances which may be brought along with the spirit into the receiver, and prevents them from being carried into the apparatus. The receiver B is covered by a glass dome, D, through which the surface of the screen and flow of spirit may at any time be seen. The spirit, having passed through the screen C, is conducted by the funnel E and discharged upon the breast of the bucket-wheel I. The wheel I is constructed somewhat similar to a breast water-wheel. The buckets of the wheel are closed at the end, and the whole is covered over and incased by the case $e$, which has an opening on its under side. The wheel I is hung upon the shaft $f$, which is supported at each end by the standards $l\ l$. When the bucket which is opposite the mouth of the funnel E is wholly or partially filled with spirit its weight causes the wheel to revolve and present another bucket opposite the funnel, while the spirit contained in the full bucket is gradually emptied as it descends, until it comes opposite the opening in the under side of the case $e$, when it will have completely discharged upon the surface of the inclined plane R. The wheel I continues revolving, receiving and discharging the spirit as long as the supply is kept up. As the spirit is discharged upon the inclined plane R it flows over the surface into the hydrometer-receiver S, and is made to flow downward to near the bottom of the receiver by coming in contact with the inner surface of the division T (which extends from side to side of the case $b\ b$) as it flows over the edge of the inclined plane R. By this arrangement the spirit must always act direct upon the under surface of the hydrometer N, and prevents the stronger spirit, which is light, from floating on top of weak and heavier spirit (which would fill up the bottom of the receiver S) into the outlet A', and thus prevent the proper action of the hydrometer N.

The hydrometer N is made of copper, and is adjusted by the weight $j$, so that it will float to any desired depth in spirit of any particular strength. This hydrometer has a small rod, $k$, attached to its upper surface, the upper end of which is connected by a small pin with the end of the lever or scale-beam L.

The scale-beam L is balanced near its center upon a pivot working in the fulcrum $h$, at the opposite end of the scale-beam L from that to which the rod of the hydrometer is attached. It is split or forked, and in the fork thus formed a small friction-wheel, K, is hung, so that it can easily revolve. This small wheel has a beveled edge with a narrow collar on each side, which fits into a groove and plain surface on the edge of a larger friction-wheel, J. The wheel J is attached to the shaft $f$ of the bucket-wheel I, and revolves with it.

A portion of the scale-beam or lever L between the fulcrum $h$ and the small friction-wheel K, is notched on its upper edge, and in any one of these notches a weight, $i$, is suspended by a hook in the same manner as the balance-weight on the beam of a platform-scale. The weight $i$ is so adjusted in one of the notches on the lever L as to balance the hydrometer N and keep it immersed to the same depth in spirit of whatever strength which is contained in the hydrometer-receiver S.

When the spirit which is contained in the receiver S is weak, and consequently of greater specific gravity than strong spirit, it will have a tendency to make the hydrometer N float more buoyantly; but it is prevented from doing so by the rod K communicating the upward pressure to the lever L, causing the end of the lever with the small friction-wheel to be depressed, and cause it to bear with greater friction on the large friction-wheel J, and retard the revolutions of the bucket-wheel I. When the spirit is strong and of less specific gravity than when it is weak, the hydrometer N will have a tendency to sink to a greater depth in the spirit, but is prevented from doing so by the weight $i$ acting on the lever; but it releases part of the friction on the friction-wheels and allows the bucket-wheel to revolve at the same rate, but with a greater quantity of spirit in each of the buckets.

By this arrangement of the hydrometer and friction-wheels the bucket-wheel will always revolve at the same rate, whether the spirit is weak and heavy or strong and light, provided the supply was of the same volume, the buckets being more or less filled, according to the weight of the spirit.

Attached to the shaft $f$ of the bucket-wheel is a small pinion, O, which is not seen on the drawings. This pinion is geared into a larger one, P, the shaft $m$ of which is supported on a small standard placed on top of the larger standard $l$, and in a small pillow-block in the outer iron case. This shaft $m$ is connected with and works the wheels or machinery of the dial or indicator Q, and is so arranged that every revolution of the wheel will be marked by unit-pointer of the dial.

The weight of spirit at any particular strength which will be contained in one revolution of the bucket-wheel having been ascertained, the whole quantity manufactured can at any time be known by multiplying the number of revolutions indicated on the dial by the weight of one revolution.

After the spirit has passed through the before-described weighing apparatus it is conducted from the receiver S into the second or measuring part by the inlet-pipe A′, and discharged into the balance-funnel B′. This funnel is constructed with a concave bottom and close sides and top, as shown on Fig. 4. It is suspended and rocks upon the shaft $o$, which is supported at one end upon the pillow-block or standard $s$, and at the other in a block let into the division G. The center of the shaft $o$ being below the inlet A′, an opening is cut in the side of the funnel B′, of such form as will allow the funnel B′ to rock backward and forward without coming in contact with the pipe or inlet A′.

In the bottom of the funnel B′, and at equal distances on each side of the center, are two narrow slits or openings, $p'$ $p^2$, which extend across the full width of the funnel. Each of these two openings on the side nearest the the center has two flanges, $q$ and $s$, the former projecting to the inside of the funnel and the latter to the outside.

When the balance-funnel is exactly balanced on the center the two flanges $q'$ and $q^2$ form a basin, which retains the spirit that flows into the funnel during the momentary pause on the center. The flanges $r'$ and $r^2$ prevent any of the spirit when it is running through the openings $p'$ $p^2$ from trickling backward on the bottom of the funnel and falling into the wrong compartment K′ or L′.

On top of and attached to the funnel B′ is a guide-frame, D′, between the small rods or bars of which a metal ball, C′, traverses from one end to the other of the frame as the funnel is lowered or raised.

The balance-frame E′ is made of brass rods bolted to a solid end, and is arranged to rock backward and forward upon a shaft resting upon the standards $t$ $t$. Between the rods a metal ball, F′, larger than the one on the balance-funnel, is placed, so that it can run with little friction from end to end of the frame as it is lowered or raised near each end of the frame, and on the side nearest the outside case, $b$ $b$, are two projecting arms, $w'$ and $w^2$, which are attached to the frame E′ at one end, and the other works in a slot cut in the head of the valve-rods O′ and O².

On the side of the frame F next to the balance-funnel are two similar projecting arms, $x'$ and $x^2$, which come in contact with the funnel B′, and communicate motion to it from the frame E′. A piece of wood framing, I′, across the case supports the funnel and frame, beneath which are two hydrometers, G′ and G², each of them in a separate compartment, K and L, formed by the division M in the case.

Each of the hydrometers has a rod, W′ W², passing through the center, and on which they slide up and down. These rods are fastened at the bottom to the floor of the compartment K′ or L′, and at the upper end to a plate let into and flush with the upper side of the wood frame I′. This plate is perforated by three or four small holes, in which small brass rods with a disk on the upper and lower end are allowed to work up and down. The lower plate of the double disk H′ and H² comes in contact with the top of the hydrometer, and on the upper disk the frame F′ rests when it is depressed to either end.

If one of the compartments — say L′ — is empty, the balance-funnel B′ and balance-frame E′ will be depressed to that side, as shown on the drawings, and the valve $v'$ will be closed, and the hydrometer G′ will rest upon the floor of the compartment L′. Spirit flowing from the inlet A′ will fall into the bottom of the funnel B′, which, from its inclination toward L, will cause the spirit to flow to that end and fall through the opening $p'$ into L, as shown by the dotted blue lines on the drawings, Fig. 4. As soon as the spirit rises to a certain height in L it will float the hydrometer G′, and by it raise the double disk H′, and also the end of the balance-frame E′. When the frame E′ is raised to a certain distance the projecting arm $x^2$ comes in contact with the elevated end of the funnel B′, and gradually depresses it as the hydrometer G′ is raised. The opening $p'$, through which the spirit is flowing, being at the same time raised, the discharge of spirit into L′ is gradually decreased until the last drop required to raise the hydrometer G′ has fallen into L, by which time the balance-funnel will be brought to a horizontal position, and the flanges $q'$ and $q^2$ will retain the spirit which falls into it while it momentarily remains in this position. As soon as the hydrometer G′ has been raised to the height sufficient to lift the frame E′ a little past a horizontal line the ball F′ immediately runs to the opposite end, causing the frame to be suddenly depressed and the balance-funnel to dip toward the compartment K′. At the same time the projecting arm $w'$ comes in contact with the upper end of the slot in the valve-rod O′, and by the weight of the ball F′ raises the valve $v'$, and allows the spirit in the compartment L to discharge through the pipe or sluice N′. When the funnel is depressed toward K the spirit will flow into it, and will do so until the hydrometer G² is raised, when the same operation as that above described will be repeated, and so on alternately as long as the spirit is allowed to flow into the funnel.

The frame on the funnel B′ and the balance-frame are so arranged on their shafts that the balls C′ and F′ will never allow them to remain balanced on their centers, but that the balls will always be at one end or the other, and that while the compartment into which the spirit is running has the valve closed, the valve of the opposite compartment will be open.

The bottom of the compartments K′ and L′ are beveled or made like a hopper, so that all the spirit may be drained off.

The valves are not of any particular form or construction, but are such that they are easily opened and shut, and form a perfectly-close joint when shut.

By the arrangement of the projecting arms $w'$ and $w^2$ the weight of the ball F′ is made to open the valves, so that the weight which the hydrometers G′ and $G^2$ has to raise is always the same, and will consequently require exactly the same amount of spirit, if the strength is the same, to raise them and the end of the balance-frame.

The metal apron P′ prevents the agitation of the spirit falling from the funnel from affecting the hydrometers.

Attached to the balance-frame E′ is a projecting arm, Q′, which is fixed to it a little above the center, so that the working of the frame causes it to describe a short arc of a circle. This arm projects through the cases and into the machinery of the indicator R, which it works, and indicates on the dial every discharge of the compartments K and L.

The number of gallons of spirit at any strength which it requires to raise the hydrometers G′ or $G^2$ being known, the whole quantity which passes through can be ascertained by multiplying this number by the number of discharges. As the spirit will constantly vary and be of unknown strengths, the average strength will be obtained by testing the strength of the spirit contained in the sample-receiver, which, as before mentioned, is the exact average of the whole quantity, and is obtained as follows: Two small brass plates, each having one edge beveled to a fine arris, are sunk flush with the surface of the inclined plane R, immediately beneath the discharge from the bucket-wheel, with the two beveled edges brought almost close together, leaving a very fine aperture, through which there is a constant trickling and dropping of a small quantity of all the spirit which is discharged from the bucket-wheel into the sample-receiver as the spirit is thoroughly mixed together by its passage through the screen and bucket-wheel before it is discharged on the upper surface of these plates. The average sample retained is a correct average of all the spirit which passes through the apparatus.

$a$ is a cock on the sample-receiver, through which the spirit can be drawn off for testing. As this is locked and secured with the Government seal, it is impossible to tamper with the spirit in the receiver.

Having thus described my invention, what I claim as new, and desire to secure by Letters Patent, is—

1. The beveled plates H in the inclined plane R, in combination with the bucket-wheel I and sample-receiver F, constructed and operating substantially as and for the purpose described.

2. The method herein described of checking the motion of the bucket-wheel I according to the specific gravity of the spirits, consisting of the hydrometer N, balance-weight I, lever L, and pulleys K J, or other equivalent means which will produce the same effect.

3. The balance-funnel B′ and tilting frame D′, in combination with the balance-frame E′ and hydrometer G G′, constructed and operating substantially as and for the purpose set forth.

The above specification of my invention signed by me this 9th day of June, 1866.

WM. MURPHY.

Witnesses:
 WM. F. McNAMARA,
 W. HAUFF.